Patented June 20, 1944

2,352,012

UNITED STATES PATENT OFFICE 2,352,012

SULPHANILAMIDE ADDITION COMPOUND

Johann Rosický, Moderschan, near Prague, Bohemia and Moravia; vested in the Alien Property Custodian No Drawing. Application October 14, 1941, Serial No. 414,927. In Germany October 14, 1940

2 Claims. (Cl. 260—239.6)

My invention relates to compounds solid at room temperature deriving from pyridine derivatives and more particularly from pyridine-$\beta$-carboxylic acid diethyl amide. The invention also includes methods for producing solid compounds of this kind.

The diethyl amide of the pyridine-$\beta$-carboxylic acid is known in the medicine as a stimulant for the circulation of the blood and for the respiration. Being at normal temperature a liquid it is delivered in the form of its aqueous solutions. This manner is often disadvantageous, more particularly in cases where the amide shall be combined with solid or insoluble substances.

It has now been found that the pyridine-$\beta$-carboxylic acid diethyl amide is capable of forming with sulphanilic amide and its isomers, i. e. metanilic acid, labile addition compounds which are solid and in part crystalline and which can easily be worked up to tablets. The linkage is loose and the addition compounds, when dissolved in or recrystallized from water, dissociate easily into the components. From solvents free of water however they can be recrystallized with ease and recovered as beautifully formed crystals.

The new compounds may be obtained by mixing pyridine-$\beta$-carboxylic acid diethyl amide with sulphanilic amide and/or its isomers in molecular proportions or with an excess of one of the components, if desired with heating, preferably above the melting point of the addition compound, or with the aid of a solvent.

The new compounds thus obtainable are therapeutically valuable substances which are determined as to their qualities by the properties of the components contained therein. Moreover, the combination as such results in further advantages for certain indications and mainly for the treatment of bacterial infectious diseases.

It is known that sulphanilic amide reduces the respiration of the cells and tissues and by this property brings about toxic secondary phenomena. In addition thereto the sulphanilic amide by their action on the central nervous system causes, if applied in larger doses, paralysis reactions of the nervous system.

I have now observed that centrally acting stimulants can to a great extent abolish the appearance of the nervous symptoms in an acute poisoning with sulphanilic amide in experiments on animals. The stimulating action on the circulation and the respiration of the new compounds manifests itself in a reduction of the toxicity of the sulphanilic amide by an increase of the oxidizing processes in the organism.

It is further known that in the treatment of infectious diseases the maintenance of intensive actions of the circulation and respiration organs is of utmost importance. The diethyl amide of the pyridine-$\beta$-carboxylic acid is to a great extent used for this purpose.

It will be seen from these explanations, that not only a technical advantage is achieved with the new compounds, viz. the conversion of the liquid diethyl amide of pyridine-$\beta$-carboxylic acid into a solid substance ready for tableting, but that some of the new compounds are moreover distinguished by an appropriate combined effect. The stimulating action on the oxidizing processes and the thereby increased resistancy of the organism against the infection is supplemented by the specific chemo-therapeutic action of the sulphanilic amide component. In comparison with separate delivery of pyridine-$\beta$-carboxylic acid diethylamide and a sulphanilic amide derivative the use of the new substances according to this invention secures the advantages that these compounds can uniformly be applied and precisely dosed and are in the handy form of tablets.

Example 1.—172 grams finely powdered sulphanilic amide are added with stirring to 178 grams pyridine-$\beta$-carboxylic acid diethyl amide. Heat is spontaneously developed. The mixture is thereupon for a short time heated to 180° C. After cooling the reaction mixture solidifies and forms a finely crystallized substance with a melting point of 92° C. If dissolved in, or recrystallized from, water this substance decomposes into its constituents.

Example 2.—178 grams pyridine-$\beta$-carboxylic acid diethyl amide and 172 grams of sulphanilic amide are commonly heated with 1500 ccms. methyl acetate until dissolved. After cooling down the addition compound crystallizes in compart crystals showing a melting point of 92–93° C.

Various changes may be made in the details disclosed in the foregoing specification without departing from the invention or sacrificing the advantages thereof.

I claim:

1. An addition compound, solid at room temperature and capable of dissociating to its components in water, composed of pyridine-$\beta$-carboxylic acid diethylamide and sulphanilamide.

2. A method of producing addition compounds of pyridine-$\beta$-carboxylic acid diethyl amide and sulphanilamide which comprises mixing the pyridine-$\beta$-carboxylic acid diethyl amide and the sulphanilic amides, heating the mixture to 180° C. to complete the reaction and then cooling to solidify the mass to a crystalline addition compound.

JOHANN ROSICKÝ.